(12) United States Patent
Dick et al.

(10) Patent No.: US 8,178,451 B2
(45) Date of Patent: May 15, 2012

(54) GLASS COMPOSITION FORMULATED FOR A GLASS-METAL BOND OF A TUBE COLLECTOR AND GLASS-METAL BOND MADE WITH GLASS OF SAID GLASS COMPOSITION

(75) Inventors: Erhard Dick, Pechbrunn (DE); Johann Collignon, Tirschenreuth (DE); Wolfgang Zettl, Mitterteich (DE); Stephan Tratzky, Neustadt/Wn (DE)

(73) Assignee: Schott AG, Mainz (DE)

( * ) Notice: Subject to any disclaimer, the term of this patent is extended or adjusted under 35 U.S.C. 154(b) by 278 days.

(21) Appl. No.: 12/557,826

(22) Filed: Sep. 11, 2009

(65) Prior Publication Data

US 2010/0069221 A1 Mar. 18, 2010

(30) Foreign Application Priority Data

Sep. 16, 2008 (DE) .................. 10 2008 047 280

(51) Int. Cl.
| | |
|---|---|
| *C03C 3/091* | (2006.01) |
| *C03C 3/089* | (2006.01) |
| *C03C 3/083* | (2006.01) |
| *C03C 3/085* | (2006.01) |
| *C03C 3/087* | (2006.01) |
| *C03C 3/078* | (2006.01) |
| *H01L 25/00* | (2006.01) |
| *H01L 31/00* | (2006.01) |
| *H01L 31/042* | (2006.01) |
| *H02N 6/00* | (2006.01) |

(52) U.S. Cl. ................ 501/66; 501/65; 501/68; 501/69; 501/70; 501/72; 136/243; 136/244; 136/251; 136/252; 136/259

(58) Field of Classification Search ............. 501/64, 501/65, 66, 68, 69, 70, 72; 136/243, 244, 136/251, 252, 259
See application file for complete search history.

(56) References Cited

U.S. PATENT DOCUMENTS

| | | | |
|---|---|---|---|
| 5,599,753 A | 2/1997 | Watzke et al. | |
| 6,204,212 B1 | 3/2001 | Kunert et al. | |
| 6,794,323 B2 | 9/2004 | Peuchert et al. | |
| 7,375,043 B2 | 5/2008 | Fechner et al. | |
| 7,491,668 B2 | 2/2009 | Fechner et al. | |
| 7,562,655 B2 | 7/2009 | Kuckelkorn et al. | |
| 2003/0087745 A1 | 5/2003 | Peuchert et al. | |
| 2004/0266603 A1 | 12/2004 | Fechner et al. | |
| 2005/0037911 A1 | 2/2005 | Fechner et al. | |
| 2005/0181925 A1 | 8/2005 | Kuckelkorn et al. | |
| 2008/0057187 A1 | 3/2008 | Trapp et al. | |
| 2008/0128923 A1* | 6/2008 | Saito et al. .................... 501/66 |
| 2008/0254301 A1 | 10/2008 | Fechner et al. | |

FOREIGN PATENT DOCUMENTS

| | | |
|---|---|---|
| DE | 44 30 710 | 5/1996 |
| DE | 100 35 801 | 2/2002 |
| DE | 10 2004 027 120 | 12/2004 |
| DE | 10 2004 027 1119 | 12/2004 |
| DE | 10 2004 008 559 | 9/2005 |
| DE | 10 2006 041 469 | 1/2008 |
| EP | 0 992 462 | 4/2000 |

OTHER PUBLICATIONS

DIN 12116: "Testing the Resistance of Glass to Attack by Boiling Hydrochloric Acid Solution, and Classification" Mar. 2001. Deutsche Norm, Ref. No. DIN 12116: 2001-03. ICS 81.040.10.
ISO 695: "Glass-Resistance to Attack by a Boiling Aqueous Solution of Mixed Alkali-Method of Test and Classification" International Standard, Third Edition, 1891-05:15, Reference No. ISO 695:1991 (E).
ISO 719: "Glass-Hydrolytic Resistance of Glass Grains At 98 Degrees Celsius—Method of Test and Classification" International Standard, UDC 666.1 : 620.193.4, Ref. No. ISO 719-1985 (E). Second Edition, Oct. 1, 1985.
DIN 17745. Sep. 2002. Knetlegierungen Aus Nickel Und Eisen: Zusaivimensetzung, ICS 77.150.40, Ref. No. DIN 17745:2002-09.

* cited by examiner

*Primary Examiner* — David M Brunsman
*Assistant Examiner* — Kevin Johnson
(74) *Attorney, Agent, or Firm* — Michael J. Striker

(57) ABSTRACT

The glass-metal bond for a tube collector includes a glass tube and metal part bonded to the glass tube. In order to match the thermal expansion properties, the glass tube has the following composition: $SiO_2$, 73-77 wt. %; $B_2O_3$, 6-<8 wt. %; $Al_2O_3$, 6-6.5 wt. %; $Na_2O$, 5.5-7 wt. %; $K_2O$, 1-3 wt. %; CaO, 0.5-3.2 wt. %; MgO, 0-2 wt. %; $Fe_2O_3$, 50-150 ppm; and $TiO_2$ 0-<100 ppm. The ratio of the sum of the alkaline-earth metal oxides (in mol %) to the sum of the alkali metal oxides (in mol %) is $\leq 0.6$. The metal part is preferably made of metal material no. 1.3981 according to DIN 17745. The glass composition itself is also part of the invention.

19 Claims, No Drawings

GLASS COMPOSITION FORMULATED FOR A GLASS-METAL BOND OF A TUBE COLLECTOR AND GLASS-METAL BOND MADE WITH GLASS OF SAID GLASS COMPOSITION

CROSS-REFERENCE

The invention described and claimed herein below is also described in German Patent Application 10 2008 047 280.8, filed Sep. 16, 2008 in Germany. The aforesaid German Patent Application provides the basis for a claim of priority of invention for the invention claimed herein below under 35 U.S.C. 119 (a)-(d).

BACKGROUND OF THE INVENTION

1. The Field of the Invention

The invention relates to a glass-metal bond made with glass having a composition that meets the requirements of glass-metal bonds, and particularly of tube collectors used in a solar energy collection apparatus. The invention also relates to the glass that is formulated with a composition that meets the requirements of the glass-metal bonds.

2. Description of the Related Art

Glass-metal bonds are used, for example, in vacuum tube collectors. In vacuum tube collectors, a vacuum-tight glass-metal bond between the absorber tube consisting of a metal and the envelope tube consisting of glass is required for thermal insulation.

Such tube collectors are used, for example, in parabolic trough solar power plants.

In parabolic trough solar power plants, operating temperatures of up to 400° C. are generated in the collectors with strong local temperature differences. In addition, temperature changes caused by the diurnal cycle and intermittent cloudy periods produce continual stresses.

In high-temperature solar collectors, on the one hand, so-called unmatched glass-metal bonds have been used to date. They are called unmatched glass-metal bonds because the glass and metal have different coefficients of thermal expansion. On the other hand, so-called matched glass-metal bonds are used, in which case one possible way of achieving the match is to use a plurality of intermediate glasses. This approach, however, has various disadvantages.

DE 10 2004 008 559 A1 discloses a glass-metal bond of a tube collector, which uses an aluminum borosilicate glass that is also employed as a material for primary pharmaceutical packaging. It is not specially adapted to the requirements of a glass for tube collectors and to the requirements of producing such a glass. A similar glass composition range of a glass, in particular for solar thermal applications, is described in DE 10 2006 041 469 B3. DE 44 30 710 C1 discloses low-boron borosilicate glasses which have a coefficient of thermal expansion $\alpha_{20/300} \leq 5.3 \times 10^{-6}/K$.

The receiver, as the key part of a tube collector for a parabolic trough solar power plant, consists of an inner tube made of steel and an outer envelope tube made of glass. The two components must be connected vacuum-tightly by means of glass-metal bonds.

The steel tube (absorber tube) is coated with a radiation-selective material, in order to ensure a high absorption ratio.

The envelope tube requires a coefficient of thermal expansion matched to the metal.

The vacuum between the envelope tube and the absorber tube reduces the heat loss and makes a contribution to optimal heating efficiency.

The envelope tube is provided with an antireflection layer which, together with the requisite high transmission of the glass, is intended to give a high transmissivity of at least 96%.

The envelope tube requires high thermal and temperature change stability, high weather resistance, i.e. a high hydrolytic stability, and high mechanical stability, i.e. high strength.

Despite its high load-bearing capacity, in particular thermal load-bearing capacity, it should be readily meltable in the least energy-intensive way possible. All these glass and production properties should furthermore be achievable with the least possible production and raw material costs.

SUMMARY OF THE INVENTION

It is therefore an object of the invention to provide a glass for a matched glass-metal bond of a tube collector, which fulfils the aforesaid requirements of glass-metal bonds.

It is also an object of the invention to provide a glass-metal bond made with the glass according to the invention, which fulfils the requirements for glass-metal bonds, especially for a tube collector of a solar energy collection apparatus.

These objects and others, which will be made more apparent hereinafter, are attained by a glass which contains the following constituents in the following amounts:

| | |
|---|---|
| $SiO_2$ | 73-77 wt. % |
| $B_2O_3$ | 6-<8 wt. % |
| $Al_2O_3$ | 6-6.5 wt. % |
| $Na_2O$ | 5.5-7 wt. % |
| $K_2O$ | 1-3 wt. % |
| CaO | 0.5-3.2 wt. % |
| MgO | 0-2 wt. % |
| $Fe_2O_3$ | 50-150 ppm |
| $TiO_2$ | 0-<100 ppm, | wherein the ratio of the sum of the amounts of the alkaline-earth metal oxides (RO), in mol %, to the sum of the amounts of the alkali metal oxides ($R_2O$), in mol %, is $\leq 0.6$, and by its use for a glass tube in a tube collector comprising a glass-metal bond.

The limitation to a comparatively small content of CaO assists in attaining a desired low melting temperature.

Setting the desired low coefficient of thermal expansion is facilitated by the aforesaid ratio, $\Sigma RO$ (mol %)/$\Sigma R_2O$ (mol %).

Similar, relatively low-boron glasses are already known from DE 100 35 801 A for use as primary packaging, for example for syringes, carpules, vials and test tubes. The production of such primary pharmaceutical packaging is based on glass tubes with a maximum outer diameter of 30 mm. Similar glasses, which are likewise processed only to form tubes with very small diameters, namely backlights, are also known from DE 10 2004 027 120 A1 and DE 10 2004 027 119 A1.

The use of such low-boron glasses to produce glass tubes for solar thermal applications, which must have a diameter of more than 120 mm, and for use in glass-metal bonds, has not been considered in the past. This is attributable to the fact that it was not previously realized that these glasses combine properties which are more suitable for use in vacuum tube collectors than those of previously used glasses.

The glasses according to the invention have a coefficient of thermal expansion $>5.3 \times 10^{-6}/K$ to $5.8 \times 10^{-6}/K$, in particular about $5.7 \times 10^{-6}/K$, which is essential for their use according to the invention and differs only by about 10% from the coefficients of thermal expansion of customary metals. The glasses are furthermore acid- and alkali-resistant (classes S1 and S2 according to DIN 12116 and DIN ISO 695), and water-resistant (class HGB 1, DIN ISO 719). Furthermore, these glasses can also be readily processed to form tubes with outer diameters >120 mm. These advantageous properties make the use of junction glasses superfluous, so that an industrially automatable production process is possible. They furthermore have low iron content, which is particularly important owing to the transmission requirements for envelope tubes in vacuum tube collectors. The person skilled in the art knows how to achieve the low iron content by selecting suitable low-iron raw materials. The ratio $Fe^{2+}/Fe^{3+}$ is in this case preferably 0.03-0.1, particularly preferably 0.045-0.055. These ratios are ensured by using sufficient nitrate levels in the batch. For example, about 0.5-1.2 wt. % nitrate is used, preferably 0.8-1.0 wt. %, for example as sodium nitrate or aluminum nitrate.

A glass, which contains the following constituents in the following composition, and its use, are preferred:

| | |
|---|---|
| $SiO_2$ | 73-77 wt. % |
| $B_2O_3$ | 6.7-7.5 wt. % |
| $Al_2O_3$ | 6.3-6.5 wt. % |
| $Na_2O$ | 5.8-6.8 wt. % |
| $K_2O$ | 1-2 wt. % |
| CaO | 2.5-3.2 wt. % |
| MgO | 0.4-1 wt. % |
| $Fe_2O_3$ | 70-130 ppm |
| $TiO_2$ | 0-<100 ppm, | wherein the ratio of the sum of the amounts of the alkaline-earth metal oxides (RO) to the sum of the amounts of the alkali metal oxides ($R_2O$) is $\leq 0.6$.

The glass may be fined with conventional fining agents in conventional amounts. The glass used preferably contains 0.1-0.3 wt. % chloride and/or 0.1-0.3 wt. % fluoride. A person skilled in the art knows how to select the content of fluorides, which are highly volatile in the melt, in the batch so that the finished glass contains the aforesaid proportion.

The glass is preferably $TiO_2$-free. Minor amounts of $TiO_2$ may however enter the glass, for example through the raw material alumina. The $TiO_2$ content is, however, limited to <100 ppm.

In order to vary the coefficient of thermal expansion $\alpha_{20/300}$, the glass may also contain further components, such as $Li_2O$, BaO in amounts of at most 1%, which do not detrimentally affect the properties required for use.

Except for impurities, for example $V_2O_5$, the glass preferably consists of the components $SiO_2$, $B_2O_3$, $Al_2O_3$, $Na_2O$, $K_2O$, CaO, optionally MgO, $Fe_2O_3$ and optionally $TiO_2$ in the aforesaid amounts.

In a preferred embodiment, the sum of the amounts of the alkaline-earth metal oxides present in the glass is $\leq 3.9$ mol %. This makes it easier to set $\alpha_{20/300}$ within the described limits of $>5.3$-$5.8*10^{-6}$/K. A lower limit of >0.9 mol % is preferred for the sum of the alkaline-earth metal oxides present in the glass used according to the invention. This makes it easier to achieve a low melting temperature.

For this preferred embodiment, CaO+MgO$\leq 3.9$ mol % applies for the particularly preferably used glasses, which except for impurities contain only CaO and MgO as alkaline-earth metal oxides.

For glasses that contain only CaO as alkaline-earth metal oxide, the upper limit is specified by the maximum CaO content of 3.2 wt %.

In another preferred embodiment, the ratio of the amounts of the alkaline-earth metal oxides present in the glass (in mol %) to the sum of the amounts of the alkali metal oxides present (in mol %) is <0.55. This also makes it easier to set $\alpha_{20/300}$ in the desired range. Furthermore, the specified ratio has a particularly favourable effect on the tensile strength. A lower limit of >0.1 is preferred for this ratio.

For this preferred embodiment, $(Na_2O+K_2O)/(CaO+MgO)<0.55$ or $(Na_2O+K_2O)/CaO<0.55$ applies for the particularly preferably used glasses, which contain only $Na_2O$ and $K_2O$ as alkali metal oxides and which, except for impurities, contain only CaO and optionally MgO as alkaline-earth metal oxides. A lower limit of >0.1 is preferred for this ratio.

In another preferred embodiment, the ratio of a total amount of $Al_2O_3$ (in mol %) to the sum of the amounts of the alkali metal oxides (in mol %) in the glass used according to the invention is <0.6. In particular, this also makes it easier to set $\alpha_{20/300}$ in the desired range. A ratio of $\leq 0.55$ is particularly preferred. A ratio <0.51 is more particularly preferred.

For this preferred embodiment, $Al_2O_3/(Na_2O+K_2O)<0.6$, particularly preferably $\leq 0.55$, more particularly preferably <0.51 applies for the particularly preferably used glasses which contain only $Na_2O$ and $K_2O$ as alkali metal oxides.

In another preferred embodiment, the ratio of a total amount of $B_2O_3$ (in mol %) to the sum of the total amount of the $B_2O_3$ plus the sum of the amounts of the alkali metal oxides (in mol %) is <0.55. This lowers the melting temperature further. A ratio <0.5 is particularly preferred. It has a particularly favourable effect on the coefficient of thermal expansion.

For this preferred embodiment, $B_2O_3/(B_2O_3+Na_2O+K_2O)<0.55$ applies for the particularly preferably used glasses which contain only $Na_2O$ and $K_2O$ as alkali metal oxides. A ratio <0.5 is particularly preferred.

In another preferred embodiment, the ratio of $SiO_2/B_2O_3$ (each in mol %) is >10.0. This leads to an improvement of the hydrolytic stability of the glass. A ratio of $SiO_2/B_2O_3$ (each in mol %) of 13±0.5 is particularly preferred.

According to a preferred use, the metal of the glass-metal bonds is a metal material in group no. 1.3981 according to DIN 17745. This material has the following composition (in % by weight): 28-30, Ni; up to 0.05, C; 16-18, Co; and remainder Fe.

The glass may be fined with conventional fining agents, such as $Sb_2O_3$, $As_2O_3$, NaCl, BaCl, CaCl, MgCl, $V_2O_5$, $Na_2SO_4$, $BaSO_4$, in conventional amounts, i.e. for example with additions of up to 0.5 wt. %. $V_2O_5$ is preferably avoided.

EXAMPLES

Three examples of glasses according to the invention (A) and two comparative examples of glasses (V) were melted from conventional raw materials.

For these exemplary embodiments A1-A3 and comparative glasses V1-V2, Tables I and III report the compositions in wt. % (Table I) and in mol % together with various sums, ratios and ratios of sums of the constituents (Table III). Table II shows the following important properties for the exemplary embodiments and comparative examples:

the coefficient of thermal expansion $\alpha_{20/300}$ $[10^{-6}$/K]
the transformation temperature $T_g$ [° C.]
the processing temperature $V_A$ [° C.]
the temperature at which the glass was melted, referred to here as the "melting temperature" [° C.]
the relative hydrolytic stability, measured according to ISO 719 and then normalized with the aid of V2 the relative tensile strength, calculated and then normalized with the aid of V2
the relative batch cost, normalized relative to V2
the solar transmission in the wavelength interval from 300 to 2500 nm [%]

TABLE I

Compositions (In Wt % Based On Oxide) Of Glasses According To The Invention (A) And Comparative Glasses (V)

|  | A1 | A2 | A3 | V1 | V2 |
|---|---|---|---|---|---|
| $SiO_2$ | 74.5 | 74.5 | 75.6 | 75.5 | 74.0 |
| $Al_2O_3$ | 6.5 | 6.4 | 6.4 | 6.4 | 6.5 |
| $Na_2O$ | 6.2 | 6.5 | 6.2 | 5.8 | 6.6 |
| $K_2O$ | 2.6 | 2.0 | 2.2 | 1.0 | 2.6 |
| CaO | 2.0 | 2.8 | 2.9 | 3.1 | 0.7 |
| MgO | — | 0.5 | 0.4 | 0.4 | — |
| $B_2O_3$ | 7.9 | 7.0 | 6.0 | 7.5 | 9.4 |

All the glasses in table I contain 0.04 wt. % $Fe_2O_3$. All these glasses furthermore contain 0.04 wt. % BaO as impurities and 0.19 wt. % chloride and 0.06 wt. % fluoride as fining agents.

TABLE II

Selected Properties Of Glasses According To The Invention (A) And Comparative Glasses (V)

|  | A1 | A2 | A3 | V1 | V2 |
|---|---|---|---|---|---|
| $\alpha_{20/300}$ [$10^{-6}$/K] | 5.7 | 5.7 | 5.6 | 5.04 | 5.7 |
| $T_g$ [° C.] | 558 | 570 | 574 | 578 | 565 |
| $V_A$ [° C.] | 1177 | 1185 | 1204 | 1214 | 1175 |
| "Melting temp." [° C.] | 1412 | 1366 | 1394 | 1398 | 1500 |
| Hydrolyt. stability | 125 (relative to 100 as standard) | 146 (relative to 100 as standard) | 149 (relative to 100 as standard) | 179 (relative to 100 as standard) | 100 (normalized) |
| Tensile strength | 102.1 (relative to 100 as standard) | 103.3 (relative to 100 as standard) | 103.4 (relative to 100 as standard) | 106.2 (relative to 100 as standard) | 100 (normalized) |
| Batch cost | 94 (relative to 100 as standard) | 88 (relative to 100 as standard) | 84 (relative to 100 as standard) | 90 (relative to 100 as standard) | 100 (normalized) |
| Solar Transmission (300-2600 nm) [%] | >92 | >92 | >92 | >92 | >92 |

TABLE III

Compositions (In Mol % On Oxide) Of Glasses According To The Invention (A) And Comparative Glasses (V) Plus The Sums And Ratios Of Selected Components

|  | A1 | A2 | A3 | V1 | V2 |
|---|---|---|---|---|---|
| $SiO_2$ | 77.9 | 77.4 | 78.6 | 78.3 | 77.6 |
| $Al_2O_3$ | 4 | 3.9 | 3.9 | 3.9 | 4 |
| $Na_2O$ | 6.3 | 6.6 | 6.2 | 5.8 | 6.7 |
| $K_2O$ | 1.7 | 1.3 | 1.5 | 0.7 | 1.7 |
| CaO | 2.2 | 3.1 | 3.2 | 3.4 | 0.8 |
| MgO | 0 | 0.8 | 0.6 | 0.6 | 0 |
| $B_2O_3$ | 7.2 | 6.3 | 5.4 | 6.7 | 8.5 |
| BaO | 0.02 | 0.02 | 0.02 | 0.02 | 0.02 |
| Cl | 0.33 | 0.33 | 0.33 | 0.33 | 0.33 |
| F | 0.2 | 0.2 | 0.2 | 0.2 | 0.2 |
| $Fe_2O_3$ | 0.02 | 0.02 | 0.02 | 0.02 | 0.02 |
| $Al_2O_3/\Sigma R_2O$ | 0.5 | 0.49 | 0.51 | 0.60 | 0.48 |
| $B_2O_3/(B_2O_3 + \Sigma R_2O)$ | 0.47 | 0.44 | 0.41 | 0.51 | 0.50 |
| $\Sigma RO/\Sigma R_2O$ | 0.2775 | 0.50 | 0.50 | 0.63 | 0.10 |
| $\Sigma RO$ | 2.2 | 3.9 | 3.8 | 4.0 | 0.8 |
| $SiO_2/B_2O_3$ | 10.8 | 12.3 | 14.6 | 11.7 | 9.1 |

Comparative example V1 is unsuitable for the use according to the invention owing to its coefficient of expansion. Comparative example V2 has to be melted at a disadvantageously high melting temperature.

As the exemplary embodiments make clear, the glasses according to the invention have the following properties, which are advantageous in particular for their use according to the invention:

They have a thermal expansion $\alpha_{20/300}$ of between >5.3× $10^{-6}$/K and 5.8×$10^{-6}$/K, in preferred embodiments about 5.7×$10^{-6}$/K, and are therefore matched to the expansion behavior of metals used in glass-metal bonds for tube collectors, in particular metal materials of no. 1.3981 according to DIN 17745

They have a transformation temperature of at most 580° C., in preferred embodiments at most 575° C. With these transformation temperatures, the collector or receiver tubes consisting of these glasses can be readily processed. Higher transformation temperatures would entail greater energy consumption for manufacturing the receivers.

They have a processing temperature $V_A$ of at most 1215° C., in preferred embodiments at most 1185° C. With these processing temperatures, the collector or receiver tubes consisting of these glasses can be readily processed. Higher processing temperatures would entail greater energy consumption for manufacturing the receivers.

The glasses have a very high hydrolytic stability, which is advantageous for processing the glasses and using the tubes.

They have a high tensile strength, which is important for processing and using the tubes.

The glasses have the desired high solar transmission.

Their total cost is relatively low. It is about 10% lower than that of the known glasses for the use according to the invention.

The glasses according to the invention can be melted at much lower temperatures, namely <1500° C., preferably <1400° C., compared with the known glasses for the use according to the invention. The energy consumption is therefore reduced by about 10%. Furthermore, the net output of the melting unit is increased.

With these properties, the glasses are straightforward and economical to produce. They can readily be processed to form glass tubes, even with sizeable diameters. They are outstandingly suitable for use as a glass tube in a tube collector having a glass-metal bond.

While the invention has been illustrated and described as embodied in a glass composition formulated for a glass-metal bond of a tube collector and glass-metal bond made with glass of that glass composition, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A glass-metal bond in a tube collector of a solar energy collection apparatus, said glass-metal bond comprising a glass tube and a metal component bonded to the glass tube, wherein said glass tube has a glass composition comprising:

| | |
|---|---|
| $SiO_2$ | 73-77 wt. % |
| $B_2O_3$ | 6-<8 wt. % |
| $Al_2O_3$ | 6-6.5 wt. % |
| $Na_2O$ | 5.5-7 wt. % |
| $K_2O$ | 1-3 wt. % |
| CaO | 2-3.2 wt. % |
| MgO | 0-2 wt. % |
| $Fe_2O_3$ | 50-400 ppm |
| $TiO_2$ | 0-<100 ppm, | wherein a ratio of a total amount of $B_2O_3$, in mol %, to a sum of the total amount of the $B_2O_3$, in mol %, plus a sum of respective amounts of the $Na_2O$ and the $K_2O$, in mol %, is <0.50;

wherein a ratio of a sum of respective amounts of alkaline-earth metal oxides, in mol %, in the glass composition to a sum of respective amounts of alkali metal oxides, in mol %, is ≦0.6; and wherein said glass composition has a thermal expansion coefficient of >5.3×10⁻⁶/K to 5.8×10⁻⁶/K, a glass transformation temperature of at most 580° C., a processing temperature of at most 1215° C., a water-resistance class of HGB 1 according to DIN ISO 719, an acid-resistance class of S1 according to DIN 12116, an alkali-resistance class of S2 according to DIN ISO 695, and a solar transmission of >92% for wavelengths from 300 to 2500 nm.

2. The glass-metal bond according to claim 1, wherein said glass composition comprises:

| | |
|---|---|
| $SiO_2$ | 73-77 wt. % |
| $B_2O_3$ | 6.7-7.5 wt. % |
| $Al_2O_3$ | 6.3-6.5 wt. % |
| $Na_2O$ | 5.8-6.8 wt. % |
| $K_2O$ | 1-2 wt. % |
| CaO | 2.5-3.2 wt. % |
| MgO | 0.4-1 wt. % |
| $Fe_2O_3$ | 70-150 ppm |
| $TiO_2$ | 0-<100 ppm, | wherein a ratio of a total amount of $B_2O_3$, in mol %, to a sum of the total amount of the $B_2O_3$, in mol %, plus a sum of respective amounts of the $Na_2O$ and the $K_2O$, in mol %, is <0.50;

wherein a ratio of a sum of respective amounts of alkaline-earth metal oxides, in mol %, in the glass composition to a sum of respective amounts of alkali metal oxides, in mol %, is ≦0.6; and wherein said glass composition has a thermal expansion coefficient of >5.3×10⁻⁶/K to 5.8×10⁻⁶/K, a glass transformation temperature of at most 580° C., processing temperature of at most 1215° C., a water-resistance class of HGB 1 according DIN ISO 719, an acid-resistance class of S1 according to DIN 12116, an alkali-resistance class of S2 according to DIN ISO 695, and a solar transmission of >92% for wavelengths from 300 to 2500 nm.

3. The glass-metal bond according to claim 1, wherein said glass composition comprises 0.1-0.3 wt. % chloride and/or 0.1-0.3 wt. % fluoride.

4. The glass-metal bond according to claim 1, wherein, except for impurities, said glass composition consists of:

| | |
|---|---|
| $SiO_2$ | 73-77 wt. % |
| $B_2O_3$ | 6-<8 wt. % |
| $Al_2O_3$ | 6-6.5 wt. % |
| $Na_2O$ | 5.5-7 wt. % |
| $K_2O$ | 1-3 wt. % |
| CaO | 2-3.2 wt. % |
| MgO | 0-2 wt. % |
| $Fe_2O_3$ | 50-150 ppm |
| $TiO_2$ | 0-<100 ppm, | wherein a ratio of a total amount of $B_2O_3$, in mol %, to a sum of the total amount of the $B_2O_3$, in mol %, plus a sum of respective amounts of the $Na_2O$ and the $K_2O$, in mol %, is <0.50;

wherein said ratio of the sum of the amounts of said alkaline-earth metal oxides, in mol %, to the sum of said amounts of said alkali metal oxides, in mol %, is ≦0.6; and wherein said glass composition has a thermal expansion coefficient of >5.3×10⁻⁶/K to 5.8×10⁻⁶/K, glass transformation temperature of at most 580° C., processing temperature of at most 1215° C., a water-resistance class of HGB 1 according to DIN ISO 719, an acid-resistance class of S1 according to DIN 12116, an alkali-resistance class of S2 according to DIN ISO 695, and a solar transmission of >92% for wavelengths from 300 to 2500 nm.

5. The glass-metal bond according to claim 1, wherein said sum of said amounts of said alkaline-earth metal oxides in said glass composition is >0.9 mol % and ≦3.9 mol %.

6. The glass-metal bond according to claim 1, wherein said ratio of said sum of said amounts of said alkaline-earth metal oxides, in mol %, to the said sum of said amounts of said alkali metal oxides, in mol %, is >0.1 and <0.55.

7. The glass-metal bond according to claim 1, wherein a ratio of a total amount of $Al_2O_3$, in mol %, in said glass composition to said sum of said amounts of said alkali metal oxides, in mol %, is <0.6.

8. The glass-metal bond according to claim 1, wherein a ratio of respective total amounts of $Fe^{2+}$ and $Fe^{3+}$ in the glass composition is from 0.03-0.1.

9. The glass-metal bond according to claim 8, wherein said ratio of said respective total amounts of said $Fe^2$ and said $Fe^{3+}$ is from 0.045-0.055.

10. The glass-metal bond according to claim 1, wherein said metal part consists of metal material no. 1.3981 according to DIN 17745.

11. A glass having a glass composition comprising:

| | | |
|---|---|---|
| $SiO_2$ | 73-77 | wt. % |
| $B_2O_3$ | 6-<8 | wt. % |
| $Al_2O_3$ | 6-6.5 | wt. % |
| $Na_2O$ | 5.5-7 | wt. % |
| $K_2O$ | 1-3 | wt. % |
| CaO | 2-3.2 | wt. % |
| MgO | 0-2 | wt. % |
| $Fe_2O_3$ | 50-150 | Ppm |
| $TiO_2$ | 0-<100 | ppm, | wherein a ratio of a total amount of $B_2O_3$, in mol %, to a sum of the total amount of the $B_2O_3$, in mol %, plus a sum of respective amounts of the $Na_2O$ and the $K_2O$, in mol %, is <0.50;
wherein a ratio of a sum of respective amounts of alkaline-earth metal oxides, in mol %, in said glass composition to a sum of respective amounts of alkali metal oxides, in mol %, is ≦0.6; and
wherein said glass has a thermal expansion coefficient of >5.3×10⁻⁶/K to 5.8×10⁻⁶/K, a glass transformation temperature of at most 580° C., a processing temperature of at most 1215° C., a water-resistance class of HGB 1 according to DIN ISO 719, an acid-resistance class of S1 according to DIN 12116, an alkali-resistance class of S2 according to DIN ISO 695, and a solar transmission of >92% for wavelengths from 300 to 2500 nm.

12. The glass according to claim 11, wherein said glass composition comprises:

| | | |
|---|---|---|
| $SiO_2$ | 73-77 | wt. % |
| $B_2O_3$ | 6.7-7.5 | wt. % |
| $Al_2O_3$ | 6.3-6.5 | wt. % |
| $Na_2O$ | 5.8-6.8 | wt. % |
| $K_2O$ | 1-2 | wt. % |
| CaO | 2.5-3.2 | wt. % |
| MgO | 0.4-1 | wt. % |
| $Fe_2O_3$ | 70-150 | ppm |
| $TiO_2$ | 0-<100 | ppm; | wherein a ratio of a total amount of $B_2O_3$, in mol %, to a sum of the total amount of the $B_2O_3$, in mol %, plus a sum of respective amounts of the $Na_2O$ and the $K_2O$, in mol %, is <0.50;
wherein a ratio of a sum of respective amounts of alkaline-earth metal oxides, in mol %, in said glass composition to a sum of respective amounts of alkali metal oxides, in mol %, is ≦0.6; and
wherein said glass has a thermal expansion coefficient of >5.3×10⁻⁶/K to 5.8×10⁻⁶/K, a glass transformation temperature of at most 580° C., a processing temperature of at most 1215° C., a water-resistance class of HGB 1 according to DIN 719, an acid-resistance class of S1 according to DIN 12116, an alkali-resistance class of S2 according to DIN ISO 695, and a solar transmission of >92% for wavelengths from 300 to 2500 nm.

13. The glass according to claim 11, wherein said glass composition comprises 0.1-0.3 wt. % chloride and/or 0.1-0.3 wt. % fluoride.

14. The glass according to claim 11, wherein, except for impurities, said glass composition consists of:

| | | |
|---|---|---|
| $SiO_2$ | 73-77 | wt. % |
| $B_2O_3$ | 6-<8 | wt. % |
| $Al_2O_3$ | 6-6.5 | wt. % |
| $Na_2O$ | 5.5-7 | wt. % |
| $K_2O$ | 1-3 | wt. % |
| CaO | 2-3.2 | wt. % |
| MgO | 0-2 | wt. % |
| $Fe_2O_3$ | 50-150 | ppm |
| $TiO_2$ | 0-<100 | ppm, | wherein a ratio of a total amount of $B_2O_3$, in mol %, to a sum of the total amount of the $B_2O_3$, in mol %, plus a sum of respective amounts of the $Na_2O$ and the $K_2O$, in mol %, is <0.50,
wherein said ratio of said sum of said amounts of said alkaline-earth metal oxides, in mol %, to said sum of said amounts of said alkali metal oxides, in mol %, is ≦0.6; and
wherein said glass has a thermal expansion coefficient of >5.3×10⁻⁶/K to 5.8×10⁻⁶/K, a glass transformation temperature of at most 580° C., a processing temperature of at most 1215° C., a water-resistance class of HGB 1 according to DIN ISO 719, an acid-resistance class of S1 according to DIN 12116, an alkali-resistance class of S2 according to DIN ISO 695, and a solar transmission of >92% for wavelengths from 300 to 2500 nm.

15. The glass according to claim 11, wherein said sum of said amounts of said alkaline-earth metal oxides in said glass composition is >0.9 mol % and ≦3.9 mol %.

16. The glass according to claim 11, wherein said ratio of said sum of said amounts of said alkaline-earth metal oxides, in mol %, to the said sum of said amounts of said alkali metal oxides, in mol %, is >0.1 and <0.55.

17. The glass according to claim 11, wherein a ratio of a total amount of $Al_2O_3$, in mol %, in said glass composition to said sum of said amounts of said alkali metal oxides, in mol %, is <0.6.

18. The glass according to claim 11, wherein a ratio of respective total amounts of $Fe^{2+}$ and $Fe^{3+}$ in the glass composition is from 0.03-0.1.

19. The glass according to claim 18, wherein said ratio of said respective total amounts of said $Fe^{2+}$ and said $Fe^{3+}$ is from 0.045-0.055.

* * * * *